United States Patent
Tetzloff (12)

(10) Patent No.: US 6,374,993 B1
(45) Date of Patent: Apr. 23, 2002

(54) CARRIER LOCKING SYSTEM FOR PENDULUM CONVEYOR

(75) Inventor: John M. Tetzloff, Edwardsville, KS (US)

(73) Assignee: LICO, Inc., Kansas City, MO (US)

( * ) Notice: Subject to any disclaimer, the term of this patent is extended or adjusted under 35 U.S.C. 154(b) by 0 days.

(21) Appl. No.: 09/662,527

(22) Filed: Sep. 14, 2000

(51) Int. Cl.[7] .............................................. B65G 17/32
(52) U.S. Cl. ................................... 198/682; 198/465.4
(58) Field of Search ........................... 198/343.2, 345.3, 198/678.1, 681, 682

(56) References Cited

U.S. PATENT DOCUMENTS

| | | | | |
|---|---|---|---|---|
| 2,409,400 A | | 10/1946 | Telford | |
| 2,634,851 A | * | 4/1953 | Steinhoff | 198/343.2 X |
| 2,664,993 A | * | 1/1954 | Mullen et al. | 198/682 |
| 2,796,973 A | * | 6/1957 | Mullen et al. | 198/682 |
| 4,402,765 A | | 9/1983 | Goto et al. | |
| 4,462,315 A | * | 7/1984 | Wakabayashi | 198/465.4 X |
| 4,831,962 A | | 5/1989 | Gros | |
| 5,718,320 A | * | 2/1998 | Marquier et al. | 198/345.3 |

* cited by examiner

*Primary Examiner*—James R. Bidwell
(74) *Attorney, Agent, or Firm*—Chase Law Firm, L.C.

(57) ABSTRACT

A carrier locking system for a horizontal pendulum conveyor employs a coupler at the free end of a generally L-shaped pendulum arm which interlocks with a receiver on a carrier. The coupler and receiver are normally in an unlocked position when the carrier travels along a horizontal path, and automatically interlock when the carrier travels along an inclined path. Locking the carrier to the pendulum arms prevents the carrier from becoming separated from the pendulum arms when descending into a surface treatment tank.

9 Claims, 9 Drawing Sheets

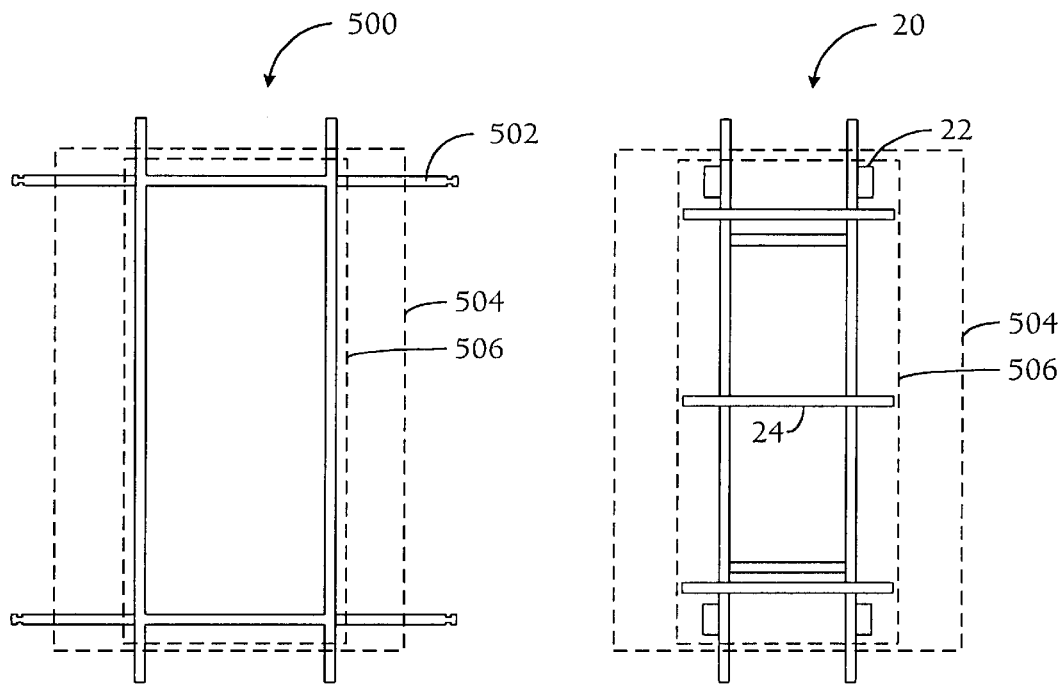
*Fig. 1*
PRIOR ART
*Fig. 2*
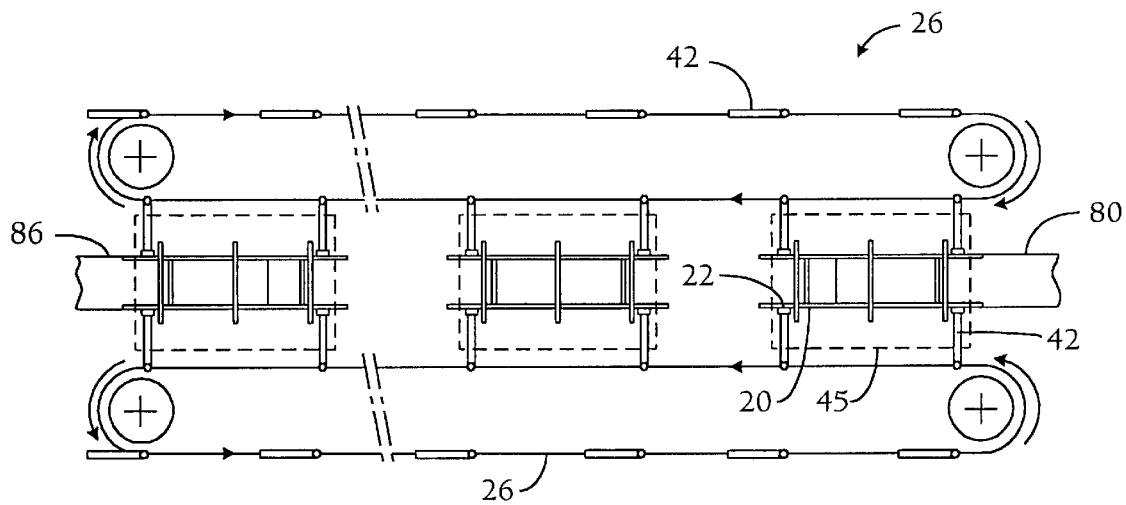
*Fig. 9*

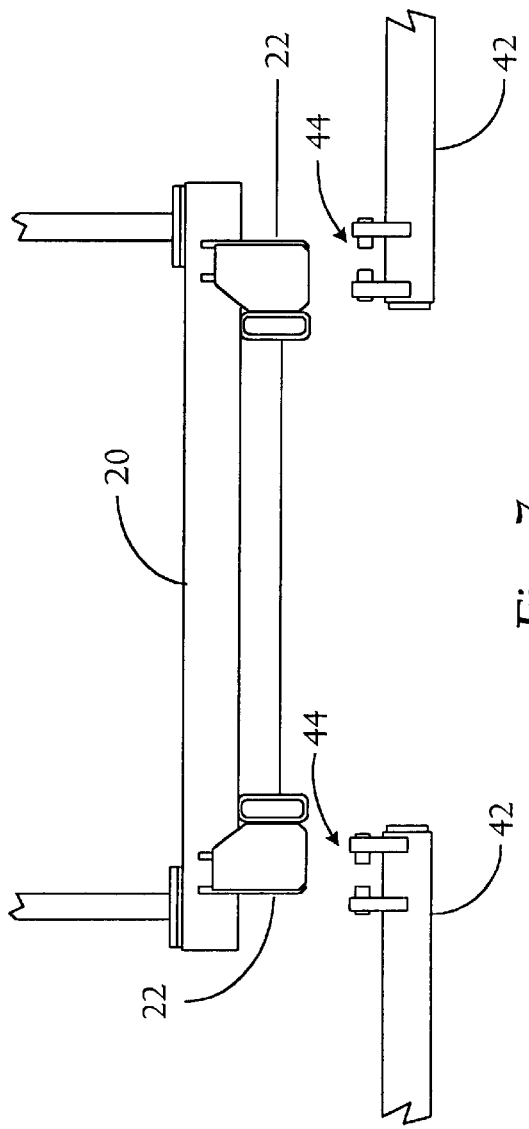
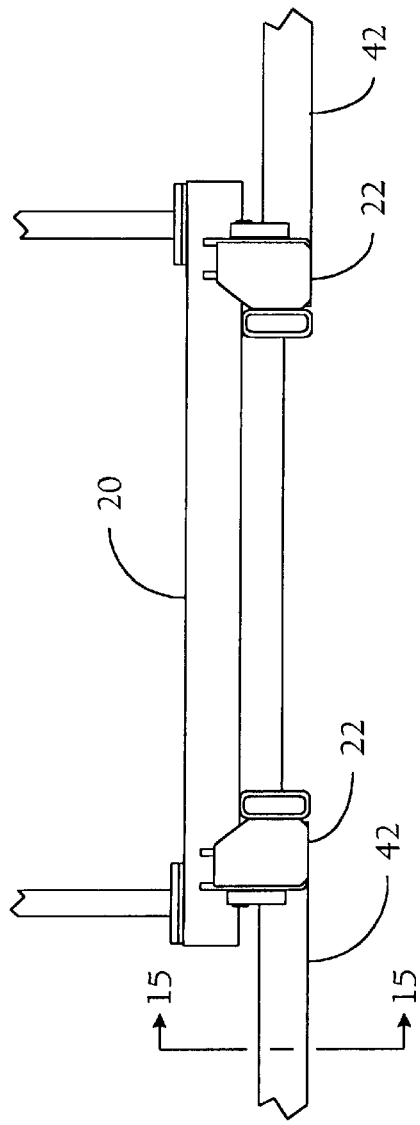
Fig. 7
Fig. 8

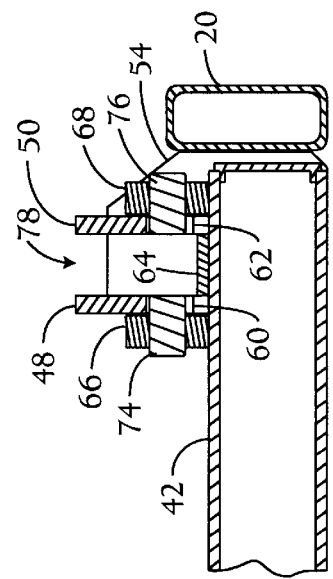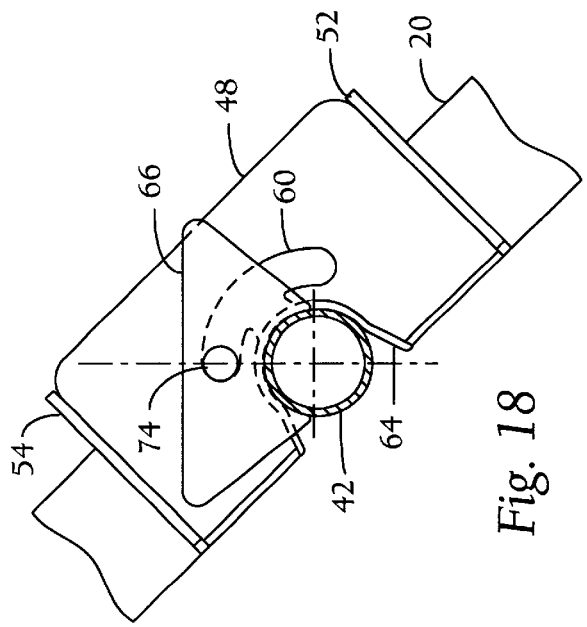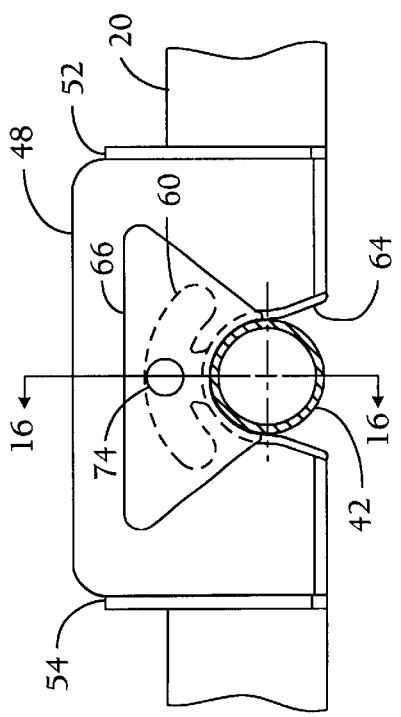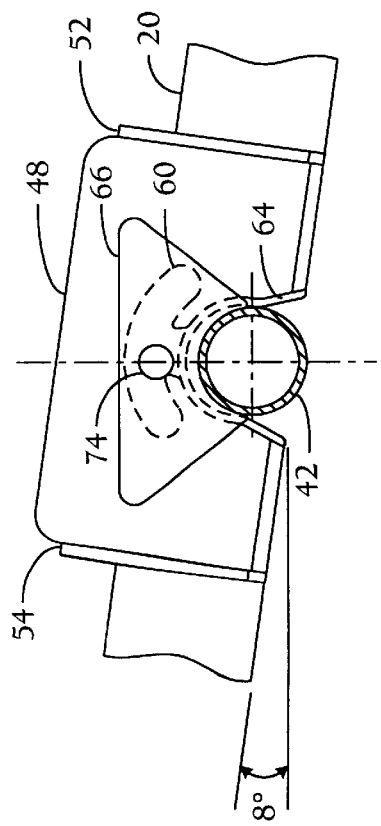

CARRIER LOCKING SYSTEM FOR PENDULUM CONVEYOR

BACKGROUND OF THE INVENTION

This invention relates to improvements in overhead horizontal pendulum conveyor systems and, in particular, to a pendulum arm therefor which cooperates with a receiver on a carrier frame to lift and transport a vehicle part or other object under assembly along an inclined as well as a horizontal path, such as through surface treatment tanks, where the carrier and part may become buoyant and tend to separate from the pendulum arms.

In the assembly line manufacture of motor vehicles such as automobiles and trucks, it is known to provide an overhead horizontal pendulum conveyor system from which pendulum arms depend, typically in groups of four for supporting the four corners of a rectangular skid frame or carrier. These conventional pendulums hang vertically from the conveyor and have hooks on their lower ends for engaging laterally outwardly projecting arms (connecting arms) extending from the supporting frame of the skid or carrier upon which an object is transported. The connecting arms must extend beyond the maximum width of the carried object to provide clearance for the pendulums. Thus the total width of the carrier must be significantly greater than the width of the object and the supporting frame.

Furthermore, when the carrier and its associated object are disengaged from the pendulum conveyor and transported by other conveyor means, an excessive lateral space is consumed by the width of the carrier frame and its connecting arms, thereby increasing the area that must be clear of obstructions. Additionally, ovens for drying components, for example, must be sized to accommodate the width of the carrier, not just the object. Such carriers also require a large amount of storage space, may be difficult or cumbersome to handle, and the protruding connecting arms may be prone to damage. Once such carrier is shown in U.S. Pat. No. 4,831,962 to Gros.

SUMMARY OF THE INVENTION

It is, therefore, the primary object of the present invention to provide a pendulum conveyor in which the width of the carrier associated therewith is minimized.

A corollary to the foregoing object is to provide a pendulum conveyor and associated carrier which are positively interlocked during upward and downward courses.

Another important object of the present invention is to provide an apparatus as aforesaid which automatically locks the pendulum arms to the carrier when the carrier is not substantially horizontal.

Still another important object of the present invention is to provide an apparatus as aforesaid that prevents the carrier and part from becoming separated from the pendulum arms when lowered into a tank of liquid through the use of a receiver on the carrier which is positively interlocked with a mating coupler on a corresponding pendulum arm.

Yet another important object of the present invention is to provide an apparatus as aforesaid which has a carrier which is not prone to damage due to protruding members and minimizes maintenance.

A further important object of the present invention is to provide an apparatus as aforesaid which minimizes the space required for storage.

Another important object of the present invention is to provide an apparatus as aforesaid which accommodates smaller assembly line equipment such as ovens and processing tanks.

Still another important object of the present invention is to provide an apparatus as aforesaid having pendulum arms which extend generally horizontally inwardly to the associated receivers to engage and lock the carrier to the arms.

These and other objects of the invention are achieved by providing a generally L-shaped pendulum arm which depends from an overhead horizontal pendulum conveyor and provides a coupler at the free end of an inwardly extending, horizontal portion of the arm. The coupler is designed to engage a receiver on an associated carrier and automatically interlock when the carrier rotates and assumes an inclined orientation during a downward or upward course of the conveyor. In vehicle part process treatment applications, this eliminates the possibility of the carrier and vehicle part floating off of the pendulum arms when descending into a treatment tank. The carriers may be conveniently handled and stored during nonuse, as the receivers do not add any significant width to the carrier frames.

Other objects and advantages of this invention will become apparent from the following description taken in connection with the accompanying drawings, wherein is set forth by way of illustration and example, an embodiment of this invention.

BRIEF DESCRIPTION OF THE DRAWINGS

FIG. 1 is plan view of a prior art carrier showing vehicle envelopes and connecting arms extending from the carrier.

FIG. 2 is a plan view of a carrier and receivers of the present invention.

FIG. 7 is a fragmentary, rear elevational view along the direction of travel of the conveyor and of the right receiver illustrated in FIG. 6.

FIG. 8 is a fragmentary, rear elevational view along the direction of travel of the conveyor and of the left receiver illustrated in FIG. 6.

FIG. 9 is a fragmentary, diagrammatic plan view of the horizontal pendulum conveyor system showing a carrier being lifted from a first conveyor, transferred by the pendulum arms and placed on a second conveyor.

FIG. 15 is a vertical sectional view taken along line 15—15 of FIG. 8 showing the coupler engaged in the receiver, on the same scale as FIG. 10.

FIG. 16 is a sectional view taken along line 16—16 of FIG. 15 showing the coupler engaged in the receiver.

FIG. 17 is a vertical sectional view similar to FIG. 15 but showing that the coupler and receiver will not separate provided the carrier is inclined at 8° or more.

FIG. 18 is a vertical sectional view showing the maximum rotational angle that the receiver and coupler can accommodate.

DETAILED DESCRIPTION

Figure 3:
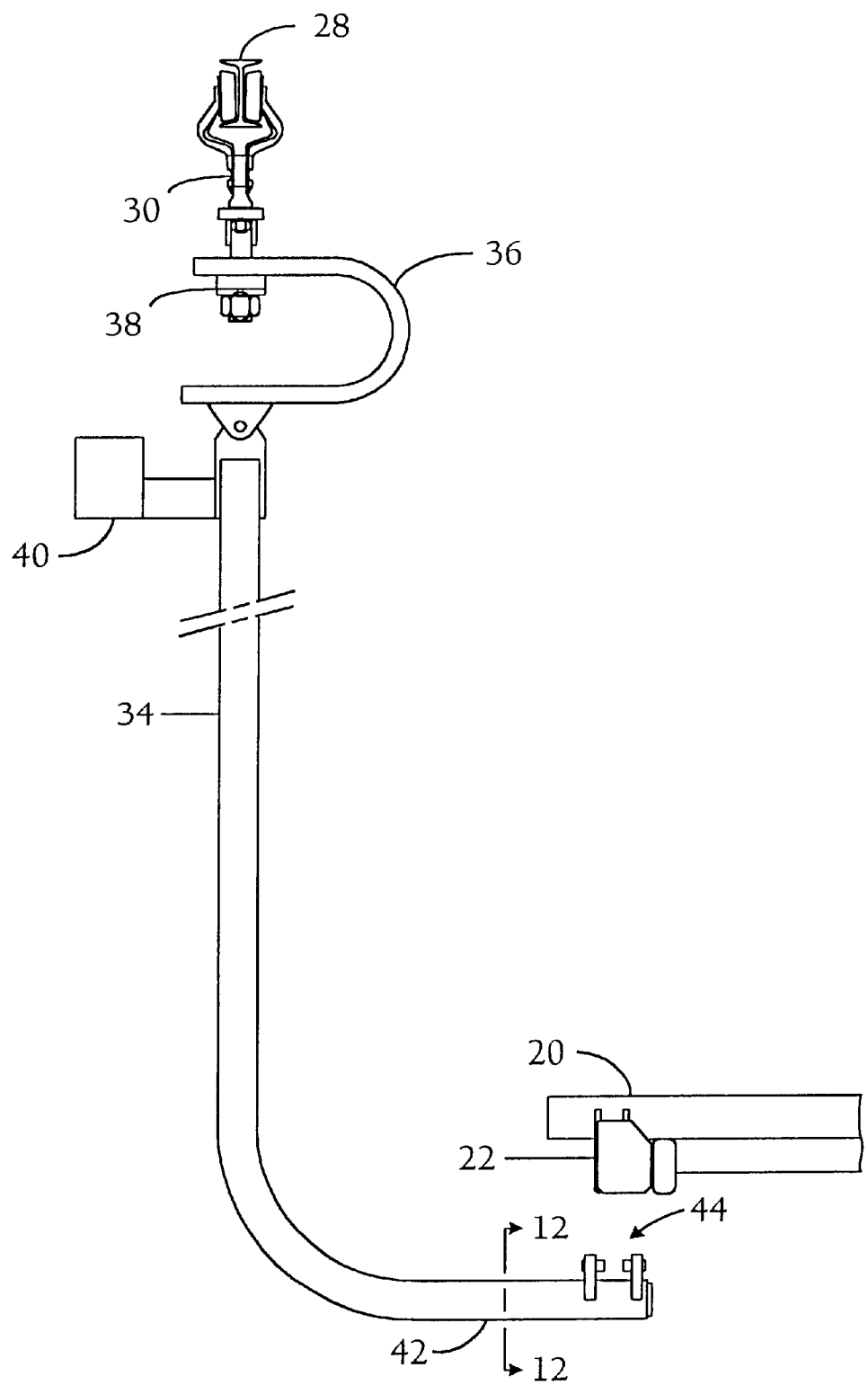
FIG. 3 is a fragmentary, rear elevational view of a pendulum suspended from a conveyor and a fragmentary, rear elevational view of a carrier frame and attached receiver.

Referring initially to FIGS. 1 and 2, a prior art carrier or skid 500 is illustrated in FIG. 1. Carrier 500 has connecting arms 502 extending laterally from the rectangular skid frame beyond the side projections of a large vehicle part or object illustrated by broken lines 504, and well beyond the side projections a smaller object or vehicle part 506. In comparison, carrier 20 of the present invention illustrated in FIG. 2 includes receivers 22 at each corner of carrier 20 and cross members 24, none of which extend beyond the side projections of vehicle parts 504 or 506.

Figure 4:
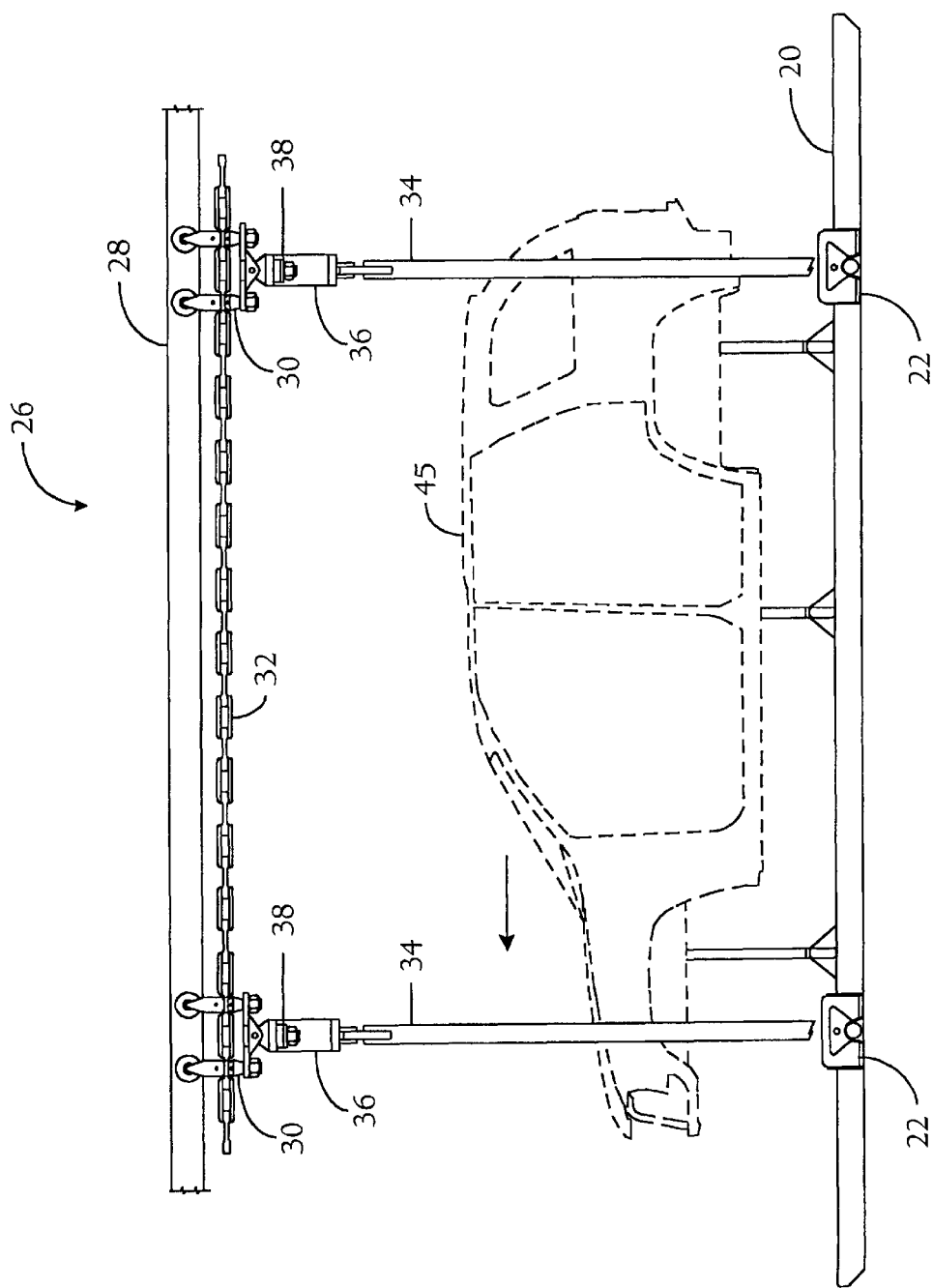
FIG. 4 is a fragmentary, side elevational view of a horizontal pendulum conveyor with the pendulums of the present invention partially cut away to show the coupler engaged in the receivers, and supporting a carrier and a vehicle frame illustrated in phantom lines thereon.
Figure 5:
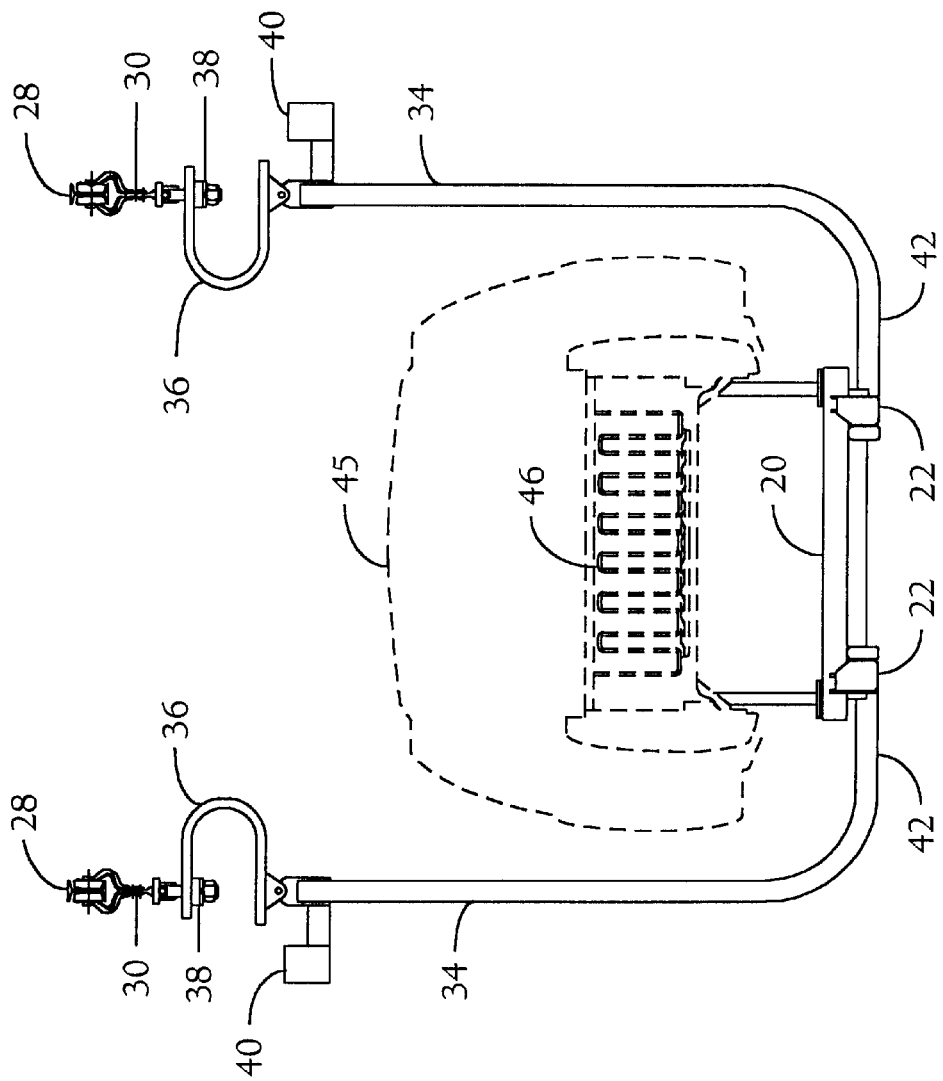
FIG. 5 is a rear elevational view of the horizontal pendulum conveyor system of the present invention showing a pair of pendulums engaged in the respective receivers attached to a carrier frame supporting a vehicle and parts illustrated in phantom lines.

Referring to FIGS. 3–5, an overhead horizontal pendulum conveyor system referenced generally by 26 has a pair of parallel, horizontally spaced-apart monorail I-beam tracks 28 which support and guide a number of trolleys 30. A drive chain 32 for each track 28 interconnects trolleys 30 below the respective track. Drive chains 32 power the trolleys 30 to move conveyor 26 in the direction indicated by the arrow in FIG. 4 (from right to left).

Each of four generally L-shaped pendulums 34 pivotally depends from the lower portion of a corresponding C-hook 36 which is bolted to an index head 38 pivotally depending from an associated trolley 30. Index heads 38 may pivot in line with the direction of travel of the conveyor 26, while pendulums 34 may pivot transversely to the direction of travel of conveyor 26. A counterweight 40 is attached to the upper end of each pendulum 34 to offset the weight of horizontal arm 42 of pendulum 34 and keep horizontal arm 42 in a generally horizontal position. The pendulums 34 are preferably constructed of steel pipe to support a heavy object or vehicle such as a sport utility vehicle.

Each pendulum 34 and cooperating parts are identical in construction. A coupler 44, attached to the free end of horizontal arm 42, is designed to engage receiver 22 attached to carrier or skid 20 to enable pendulum 34 to lift skid 20 and securely carry a vehicle 45 and parts 46. Considering coupler 44 and receiver 22 in more detail (FIGS. 10–14), receiver 22 is generally an open rectangularly shaped box having spaced-apart generally parallel outer 48 and inner 50 walls. End walls 52 and 54 present the ends of receiver 22 and are secured to carrier 20. A receiver 22 is preferably attached at each corner of carrier 20 (FIG. 2) to provide lifting points to evenly distribute the weight of a transported object. Outer 48 and inner 50 walls present generally arch-shaped apertures 56 and 58 respectively which are in axial alignment with receiver axis 59. Receiver axis 59 is generally perpendicular to outer 48 and inner 50 walls of receiver 22. Outer 48 and inner 50 walls also present aligned arcuate slots 60 and 62 which are in communication with apertures 56 and 58 respectively. Arch or saddle member 64 extends between walls 48 and 50 and is secured along the inside edges of arches 56 and 58. The inside curvature of saddle member 64 generally conforms to the outside curvature of horizontal arm 42.

Coupler 44 generally comprises of a pair of spaced-apart inverted generally triangular plates 66 and 68 each having an arcuate cut-out 70 and 72 for receiving horizontal arm 42. Coupler 44 is welded or otherwise secured to the free end of arm 42. Coupler plates 66 and 68 each have apertures which are in axial alignment with a locking pin axis 73 which is generally parallel to horizontal arm axis 43 and through which opposed locking pins 74 and 76 extend inwardly respectively to a channel 78 formed between plates 66 and 68.

Referring to FIGS. 15 and 16, when coupler 44 is seated in receiver 22, receiver axis 59 and horizontal arm axis 43 are in a coaxial relationship, and saddle 64 rides on the surface of horizontal arm 42 within channel 78. The radial distance between the center line 61 of slot 60 and receiver axis 59 is approximately equal to the radial distance from horizontal arm axis 43 and locking pin axis 73. Thus, locking pins 74 and 76 are approximately centered within arcuate slots 60 and 62. As illustrated in FIG. 15, coupler 44 and receiver 22 are in an unlocked position.

Figure 6:
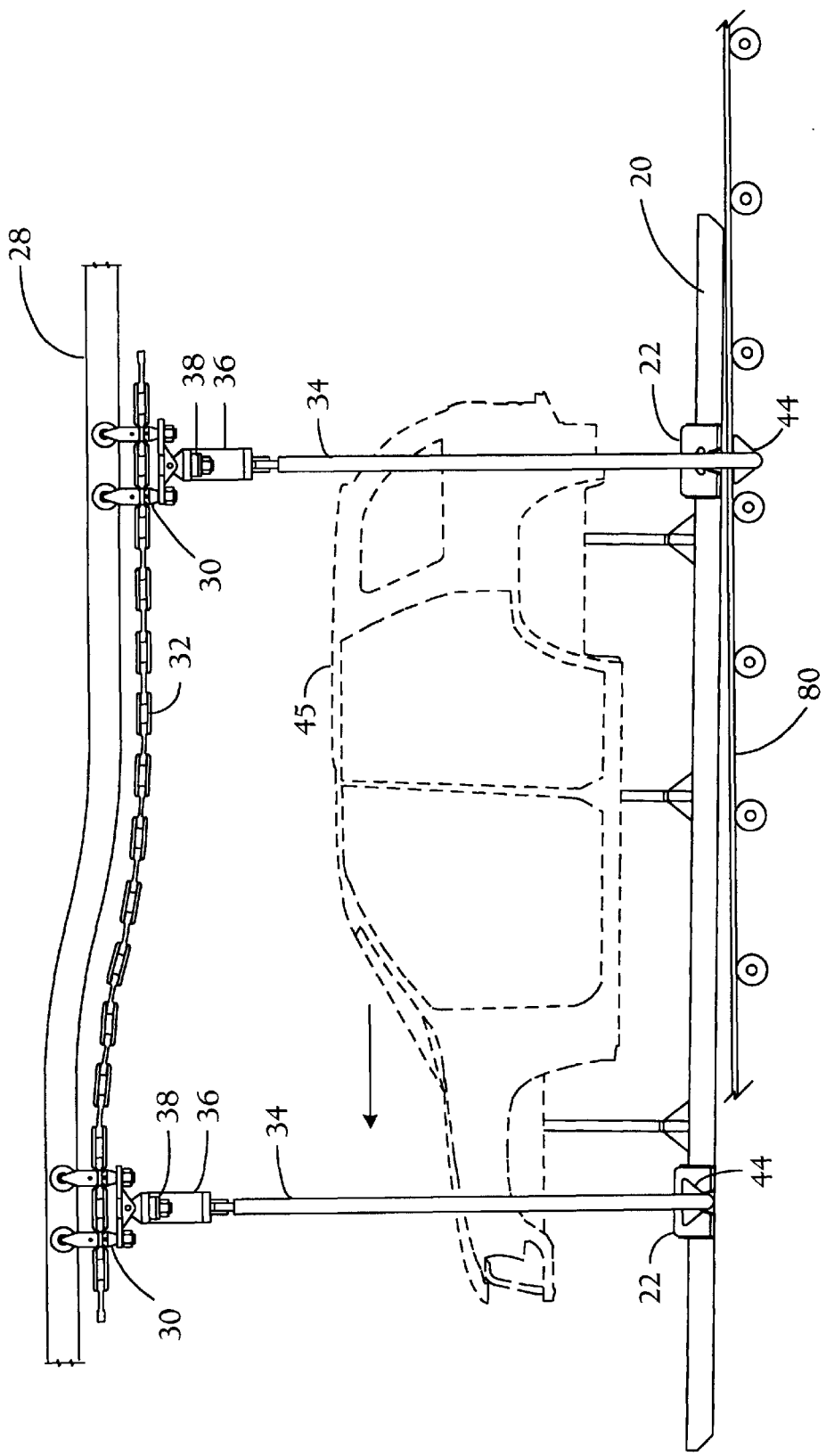
FIG. 6 is a fragmentary, side elevational view of a portion of a horizontal pendulum conveyor showing a vehicle illustrated in phantom lines supported by a carrier frame being lifted from a conveyor by the pendulum arms.
Figures 10, 11:
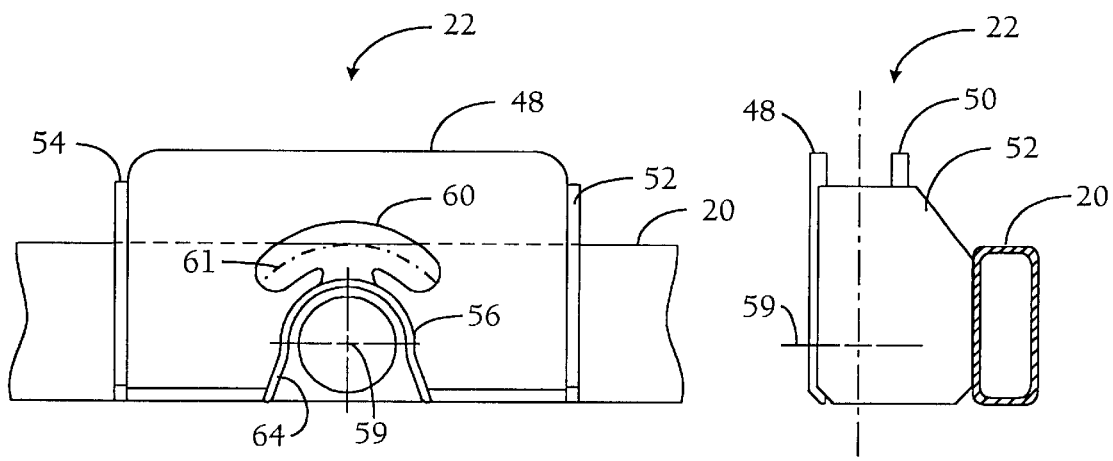
FIG. 10 is a detail view showing a receiver in side elevation.
FIG. 11 is a right end elevational view of the receiver shown in FIG. 10.
Figures 12, 13:
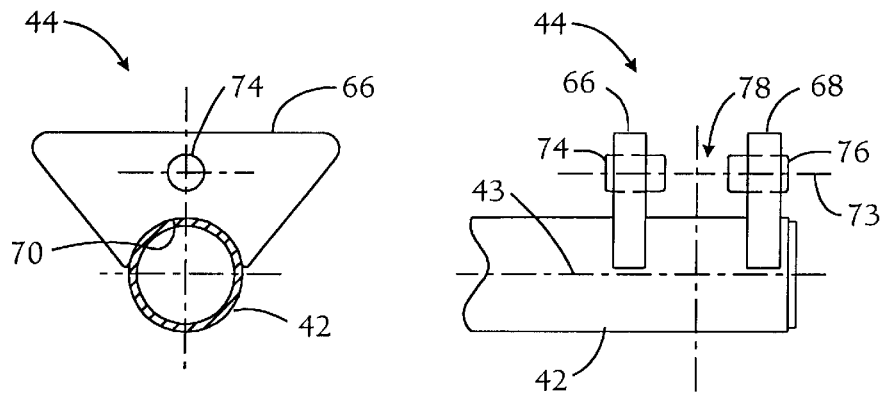
FIG. 12 is a vertical sectional view taken along line 12—12 of FIG. 3 showing the coupler on the same scale as FIG. 10.
FIG. 13 is a fragmentary, end elevational view of the horizontal arm and coupler.
Figure 14:
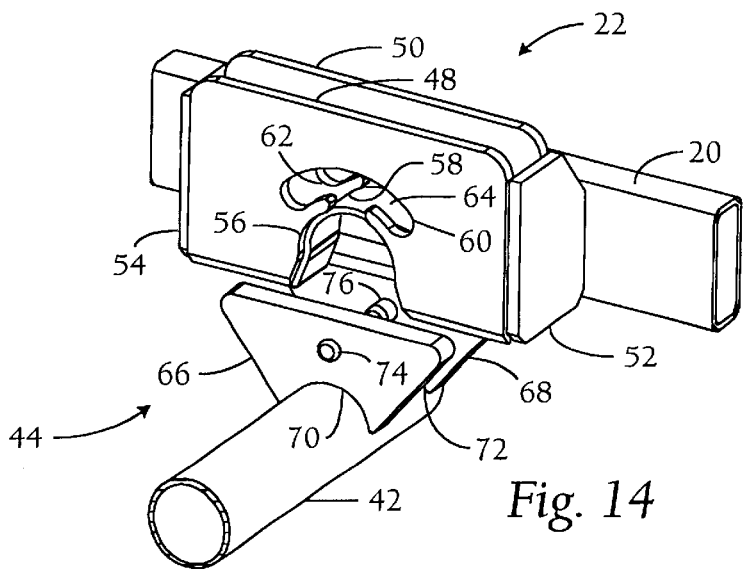
FIG. 14 is a perspective view of the coupler and receiver prior to engagement.
Figure 19:
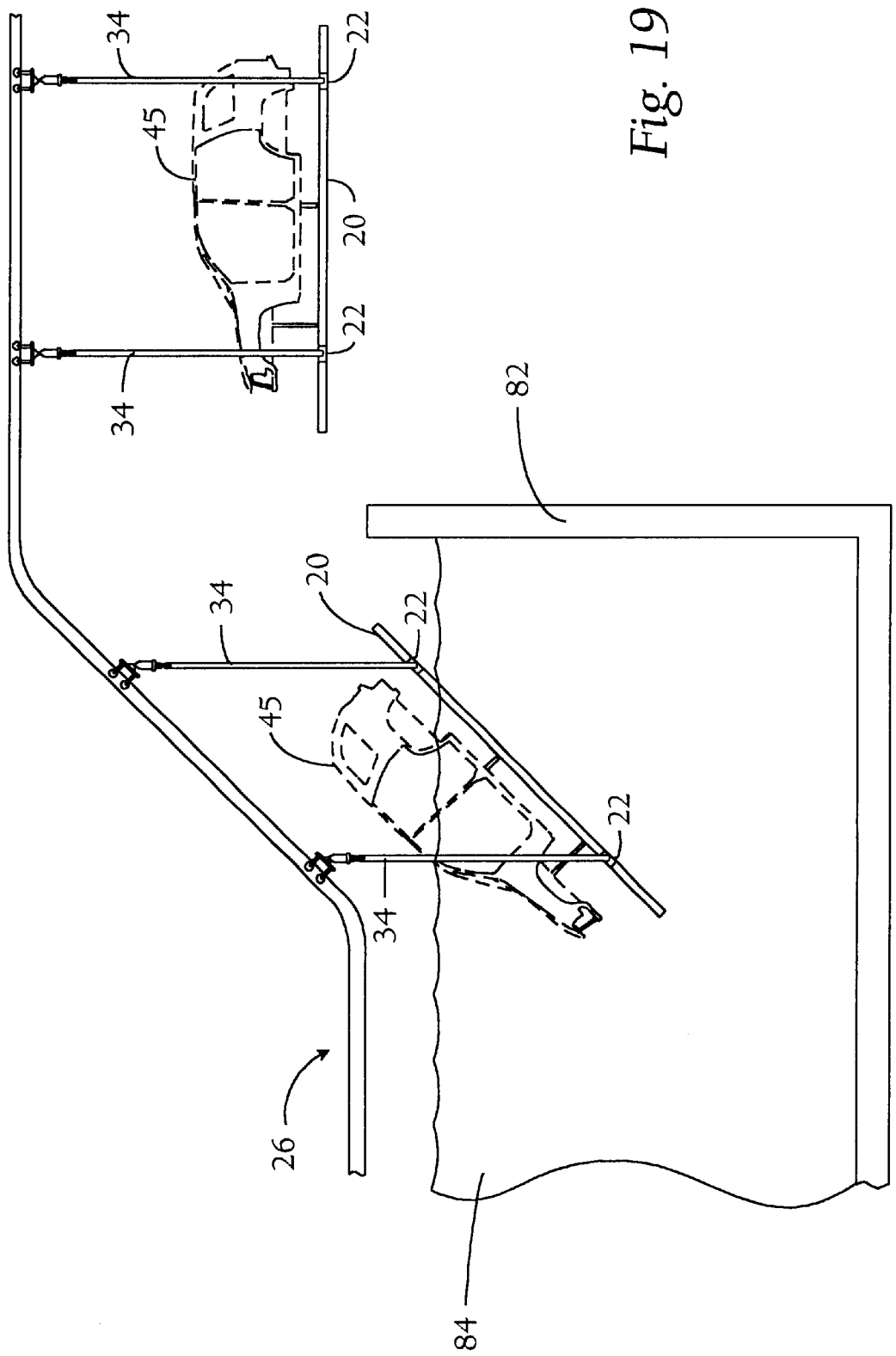
FIG. 19 is an illustration of a carrier and vehicle part descending into a treatment tank.

Referring to FIGS. 6–8, as carrier 20 supporting vehicle part 45 travels in the direction indicated in FIG. 6 (from left to right) along inverted power and free conveyor or skid conveyor 80, pendulum conveyor system 26 moves in synchronism so that pendulums 34 are aligned with the receivers 22. Horizontal pendulum arms 42 on each side of skid 20 approach skid 20 approximately seven inches below the right receiver 22 in FIG. 6 and the receivers 22 shown in FIG. 7 looking in the direction of travel of conveyor 26. Monorail 28 provides a nine inch rise thus lifting skid 20 two inches off a conveyor represented at 80 (shown in FIG. 6) and fully engaging coupler 44 and the left receiver 22 of FIG. 6 (see FIG. 8 looking in the direction of travel of conveyor 26). The outwardly tapered channels of arcuate slots 60 and 62 assist in guiding the coupler into the receiver as the skid 20 is lifted from conveyor 80 (see FIGS. 6, 14, 15 and 17).

Referring to FIGS. 6, 9 and 15–19, carrier 20 transporting vehicle part 45 is lifted from conveyor 80 and carried to process dip tank 82. Carrier 20 may pivot up to approximately 45 degrees as it descends into and ascends from tank 82. Likewise, saddle 64 in each receiver 22 pivots on the connecting horizontal arm 42 (FIG. 18). As vehicle part 45 descends into tank 82, air becomes trapped in the vehicle part 45. Because of this trapped air, vehicle part 45 and carrier 20 may become buoyant and float in the processing liquid 84, becoming separated from pendulums 34 and eventually sink to the bottom of processing tank 82. Locking pins 74 and 76 interlock each receiver 22 and coupler 44 to prevent vehicle 45 and carrier 20 from separating from horizontal pendulum arm 42 of pendulum 34.

After vehicle 45 is treated in processing tank 82, carrier 20 is lowered onto inverted power and free conveyor or skid conveyor 86 and automatically released from pendulums 34. As pendulums 34 reach the end of the overhead conveyor 26, having released carrier 20 on conveyor 86, the empty pendulums 34 continue around conveyor 26 as indicated by the direction arrows in FIG. 9. Index heads 38 rotate 90 degrees so that horizontal pendulum arms 42 are parallel with the direction of travel to reduce the area required for conveyor system 26. As the pendulums 34 reach the beginning of the conveyor system 26, each index head 38 rotates back 90 degrees so that horizontal pendulum arm 42 is once again generally transverse to the direction of travel of carriers 20 on conveyor system 26 in order to pick-up another carrier 20.

From the forgoing description it should be appreciated that the width of carrier 20 is substantially less than prior art carriers and thus inherently requires less storage space. Additionally, because the receivers 22 do not extend significantly from the sides of carrier 20, receivers 22 are not prone to encountering normal obstructions in an assembly line environment and thereby become damaged. Horizontal arms 42 extend to engage carrier 20 only when necessary to transport carrier 20 and are otherwise parallel to the conveyor system 26 direction of travel to eliminate an unnecessary use of space around the conveyor 26 when pendulums 34 are returning to the beginning of the conveyor line.

It is to be understood that while a certain now preferred form of this invention has been illustrated and described, it is not limited thereto except insofar as such limitations are included in the following claims and allowable equivalents thereof.

Having thus described the invention, what is claimed as new and desired to be secured by Letters Patent is as follows:

1. In a pendulum conveyor system:

a generally L-shaped pendulum depending from an overhead conveyor apparatus that defines a path of travel along which products are conveyed, said pendulum having an arm extending transversely of said path of travel and presenting a free end provided with a coupler, a carrier for transporting a product along said path of travel, and a receiver secured to said carrier and engageable with said coupler for pivotally interconnecting said pendulum arm and said carrier, said receiver having means for interlocking said coupler and said receiver upon relative pivotal movement of said coupler and said receiver away from an unlocked position.

2. In the system as claimed in claim 1, there being four of said L-shaped pendulums and four of said receivers, said carrier having four corners, and each of said receivers being secured to said carrier proximal to a corresponding corner for engagement with the coupler of an associated pendulum arm.

3. In the system as claimed in claim 1, wherein said means for interlocking prevents separation of said coupler and said receiver in response to said relative pivotal movement away from an unlocked position.

4. In the system as claimed in claim 1, wherein said pendulum arm defines an axis at the free end thereof, said coupler having a coupling component spaced from said axis, and wherein said means for interlocking receives said component and captures the component in response to said relative pivotal movement away from an unlocked position to thereby prevent separation of said coupler and said receiver.

5. In a pendulum conveyor system:

a generally L-shaped pendulum depending from an overhead conveyor apparatus, and having a downwardly extending member and a generally horizontal arm, said pendulum arm having a free end with a coupler thereon, a skid carrier for transporting objects along a path of travel of said conveyor apparatus, and a receiver secured to said carrier and having a saddle for pivotally receiving said free end to interconnect said pendulum arm and said carrier, said receiver having means for interlocking said coupler and said receiver upon pivotal movement of said receiver away from a normal, unlocked position.

6. In the system as claimed in claim 5, there being four of said L-shaped pendulums and four of said receivers, said carrier having four corners, and each of said receivers being secured to said carrier proximal to a corresponding corner for engagement with the coupler of an associated pendulum arm.

7. In the system as claimed in claim 5, wherein said means for interlocking prevents separation of said coupler and said receiver in response to said pivotal movement away from an unlocked position.

8. In the system as claimed in claim 5, wherein said pendulum arm defines an axis at the free end thereof, said coupler having a coupling component spaced from said axis, and wherein said means for interlocking receives said component and captures the component in response to said pivotal movement away from an unlocked position to thereby prevent separation of said coupler and said receiver.

9. In the system as claimed in claim 8, wherein said coupler has a pair of said locking components in opposed relationship defining a channel therebetween, said receiver having structure in said channel when said saddle receives said free end, said structure having locking slot means receiving said components to present said means for interlocking said coupler and said receiver.

* * * * *